United States Patent
Miller et al.

(10) Patent No.: US 8,728,262 B2
(45) Date of Patent: May 20, 2014

(54) RAPID FABRICATION OF A COMPOSITE PART

(75) Inventors: Jeffrey L. Miller, Mukilteo, WA (US); Stephen J. Dostert, Edmonds, WA (US); Michael J. Louderback, Mission Viejo, CA (US)

(73) Assignee: The Boeing Company, Chicago, IL (US)

( * ) Notice: Subject to any disclaimer, the term of this patent is extended or adjusted under 35 U.S.C. 154(b) by 161 days.

(21) Appl. No.: 13/291,083

(22) Filed: Nov. 7, 2011

(65) Prior Publication Data

US 2013/0014889 A1  Jan. 17, 2013

Related U.S. Application Data

(63) Continuation-in-part of application No. 13/267,876, filed on Oct. 6, 2011, and a continuation-in-part of application No. 13/267,878, filed on Oct. 6, 2011.

(60) Provisional application No. 61/507,115, filed on Jul. 12, 2011.

(51) Int. Cl.
 *B29C 33/38* (2006.01)
 *B29C 33/40* (2006.01)

(52) U.S. Cl.
 USPC ............ 156/156; 156/523; 156/577; 264/220

(58) Field of Classification Search
 USPC ............ 264/39, 219, 220, 257, 258; 156/169, 156/173, 175, 155, 523, 574, 577; 249/203
 See application file for complete search history.

(56) References Cited

U.S. PATENT DOCUMENTS

| | | | |
|---|---|---|---|
| 4,863,663 A | 9/1989 | Nico, Jr. et al. | |
| 5,074,949 A | 12/1991 | Greffioz et al. | |
| 5,341,918 A | 8/1994 | Covert | |
| 6,168,358 B1 | 1/2001 | Engwall et al. | |
| 6,643,615 B1 | 11/2003 | Bauer et al. | |
| 6,692,681 B1 * | 2/2004 | Lunde | ......... 264/510 |
| 6,928,396 B2 | 8/2005 | Thackston | |
| 7,080,441 B2 | 7/2006 | Braun | |
| 7,282,107 B2 | 10/2007 | Johnson et al. | |
| 7,459,048 B2 | 12/2008 | Pham et al. | |

(Continued)

FOREIGN PATENT DOCUMENTS

| | | |
|---|---|---|
| EP | 0521813 B1 | 1/1993 |
| GB | 2115594 B | 9/2013 |
| WO | 9850180 A1 | 12/1998 |
| WO | 0126869 A1 | 4/2001 |

OTHER PUBLICATIONS

Vermont Composites, "Manufacturing Capabilities," http://www.vtcomposites.com/Vermont_Composites_Capabilities/Manufacturing_Capabilities.aspx.

*Primary Examiner* — Scott W Dodds
(74) *Attorney, Agent, or Firm* — Hugh P. Gortler

(57) ABSTRACT

A method of fabricating a composite part including reinforcing fibers comprises fabricating a masterless layup mandrel tool at a fabrication site. The tool includes a composite face sheet that provides a layup surface. The method further comprises using the masterless tool at that site to form a layup of the reinforcing fibers.

13 Claims, 6 Drawing Sheets

(56) References Cited

U.S. PATENT DOCUMENTS

| | | |
|---|---|---|
| 7,913,390 B2 | 3/2011 | Masters et al. |
| 7,935,289 B2 | 5/2011 | Anderson |
| 7,963,039 B2 | 6/2011 | Burnett et al. |
| 7,968,021 B2 | 6/2011 | Cleary, Jr. et al. |
| 2006/0180264 A1 | 8/2006 | Kisch |
| 2008/0099955 A1* | 5/2008 | Cleaver ............... 264/219 |
| 2008/0295954 A1* | 12/2008 | Kisch et al. ............ 156/249 |
| 2009/0076638 A1* | 3/2009 | Hu et al. ............... 700/97 |

* cited by examiner

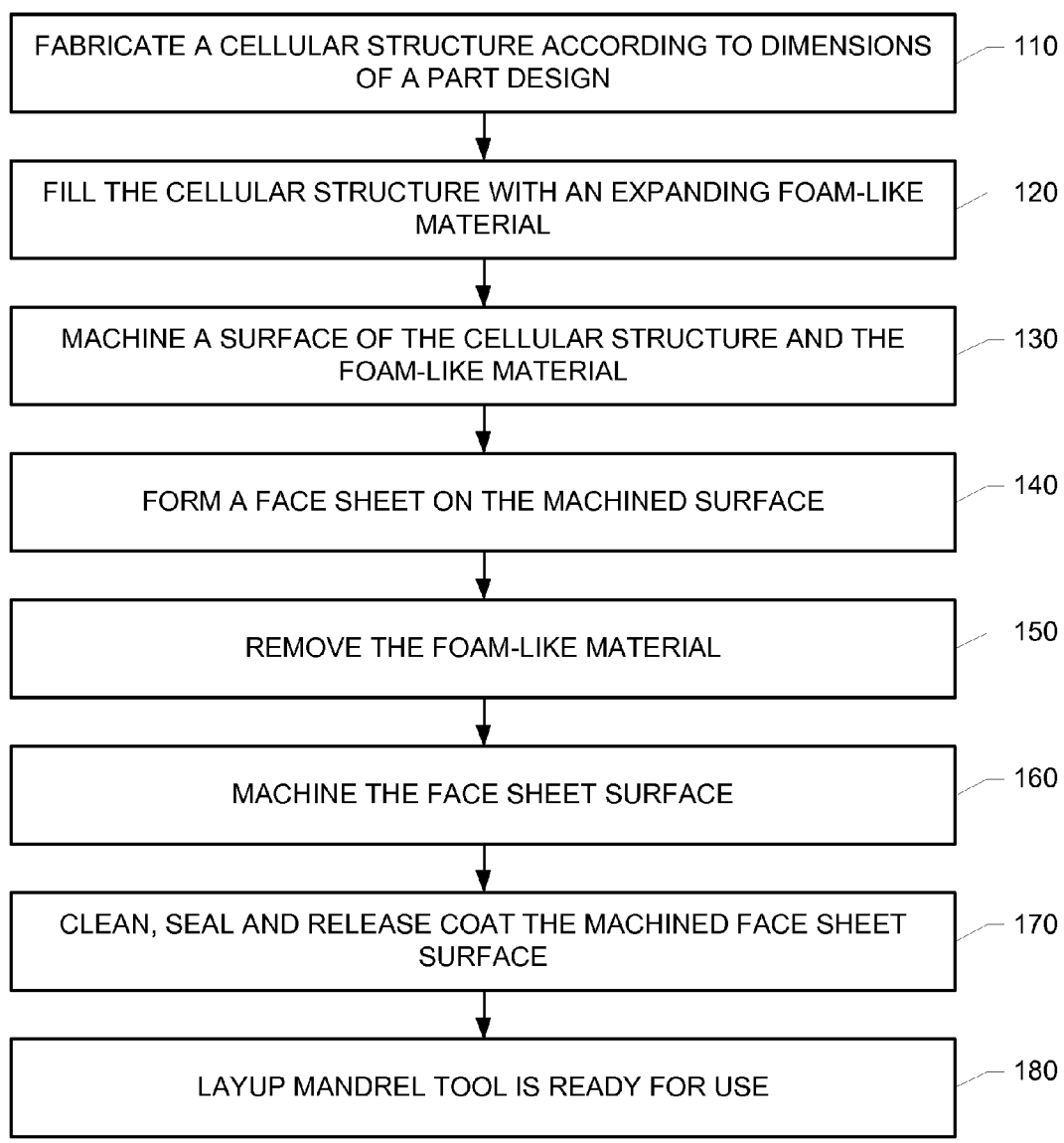

RAPID FABRICATION OF A COMPOSITE PART

This is a continuation-in-part of U.S. Ser. Nos. 13/267,876 and 13/267,878, both filed on 6 Oct. 2011. This application and the parent applications claim the benefit of provisional application 61/507,115 filed Jul. 12, 2011.

BACKGROUND

Composites including plies of reinforcing fibers embedded in a matrix are highly desirable for their light weight and high strength. One example of such a composite is carbon fiber reinforced plastic (CFRP), where the constituents include carbon fibers embedded in an epoxy matrix.

Fabrication of a composite part involves depositing reinforcing fibers on a tool surface of a layup mandrel tool. The fibers may be pre-impregnated with resin upon deposition ("prepregs"), or they may be dry and subsequently infused with resin. The resin-infused fibers or the pre-impregnated fibers are bagged and then cured.

Rapid fabrication of composite parts is desirable for a wide variety of reasons. Rapid fabrication may be used to prototype a part for an aircraft, automobile or other structure to provide a competitive assessment, trade study, or even working model. Rapid fabrication may be used to repair a product such as an aircraft, automobile, wind turbine or civil structure (e.g., a bridge component) and quickly return that product to useful service.

SUMMARY

According to an embodiment herein, a method of fabricating a composite part including reinforcing fibers comprises fabricating a masterless layup mandrel tool at a fabrication site. The tool includes a composite face sheet that provides a layup surface. The method further comprises using the masterless tool at that site to form a layup of the reinforcing fibers.

According to another embodiment herein, a method of fabricating a composite part comprises fabricating a masterless layup mandrel tool at a fabrication site having a clean section and an adjacent dirty section. The tool includes a composite face sheet that provides a mold line surface. Fabricating the tool includes creating a cellular structure, filling cells of the cellular structure with a foam-like material, and machining the foam-like material to obtain a machined surface in the dirty section, and laying up composite material on the machined surface to form the face sheet in the clean section. The method further comprises using the masterless tool at that site to form a layup of reinforcing fibers in the clean section.

According to another embodiment herein, a method of fabricating a composite part comprises applying a set of rules governing material laydown to an engineering definition of the composite part to determine allowable tape widths for the reinforcing fibers; selecting an allowable tape width that increases speed of forming the layup; fabricating a masterless layup mandrel tool at a fabrication site, the tool including a composite face sheet that provides a mold line surface; and depositing the selected tape on the mold line surface to form a layup of the reinforcing fibers.

BRIEF DESCRIPTION OF THE DRAWINGS

FIG. 1 is a method of fabricating a masterless layup mandrel tool.

DETAILED DESCRIPTION

Reference is made to FIG. 1, which illustrates a method of creating a masterless layup mandrel tool for the fabrication of a composite part. A masterless tool refers to a tool that is not formed by a permanent mold.

At block 110, a cellular structure is fabricated according to dimensions of a part design. The cellular structure provides a billet that will encompass the overall tool and will include the rough contour and profile for the part. For certain parts, such as aircraft parts, this may be a constant curvature or a complex compound contour. The cellular structure may be formed from header boards. The material system, and density and thickness of the header boards may be tailored to a desired durability of the mandrel tool. Material systems may include, without limitation, epoxy and Bismaleimide (BMI). The header boards may be cut with a water jet, router, or other tool. They may be tied together by bonding, mechanical fastening, or both. Angles may be attached for additional reinforcement.

Figure 2A:
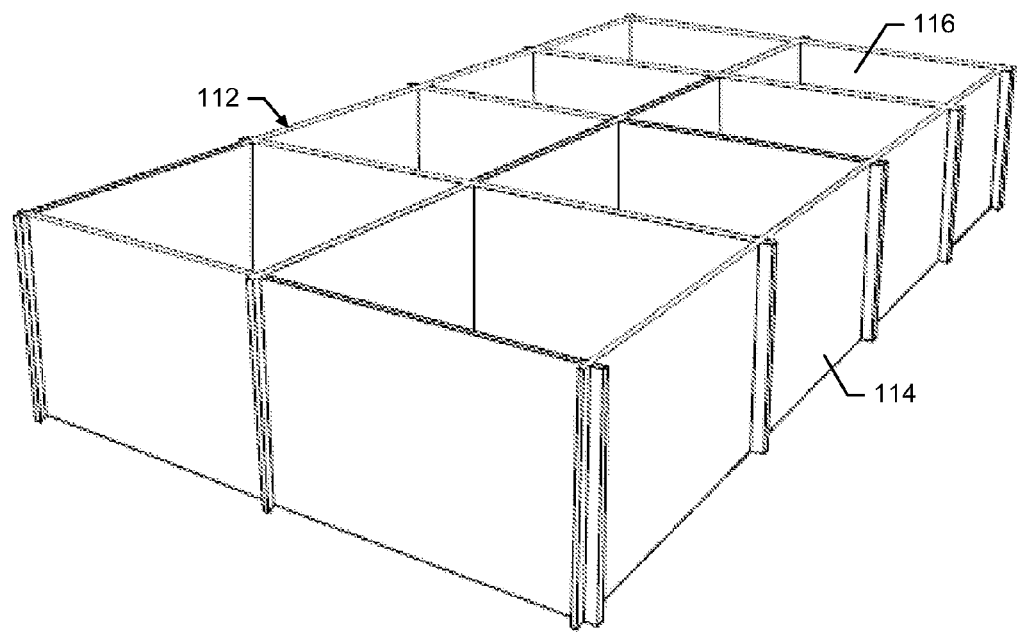
FIGS. 2A-2D are illustrations of a masterless layup mandrel tool during various stages of fabrication.

Additional reference is made to FIG. 2A, which illustrates an "egg crate" cellular structure 112. This cellular structure is formed from header boards 114, which define an array of open cells 116. The egg crate structure 112 is open at the top and bottom.

Figure 2B:
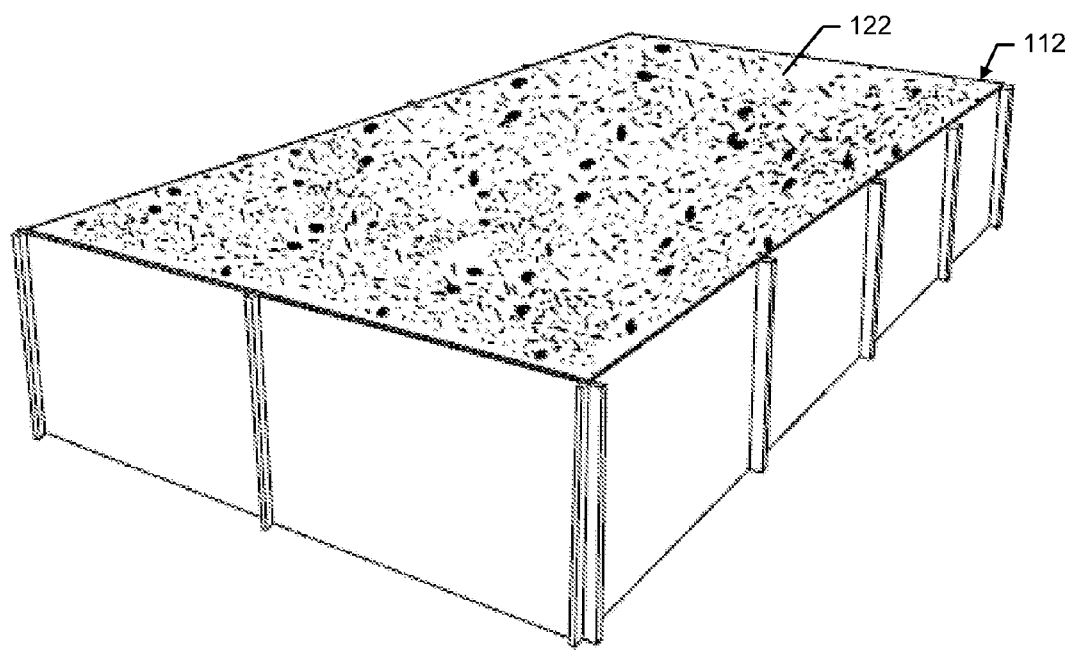

At block 120, the cellular structure 112 is filled with an expanding foam-like material 122 (see FIG. 2B). The foam-like material 122 maintains dimensional stability during processing conditions such as layup and curing. For instance, the foam-like material 122 should not degrade or shrink or expand at temperatures for resin infusion and curing, or prepreg curing. The foam-like material 122 should not degrade or shrink or expand at these temperatures. The foam-like material 122 should not distort under pressure during resin infusion (or autoclave pressure of curing prepregs. Dimensional stability and compressive strength requirements should be maintained so that a composite face sheet, which is subsequently formed on the cellular structure 112, is cured in a predictable position. If dimensional stability of the foam-like material 122 is not achieved, additional material may be added to the face sheet. This is undesirable. For instance, if the face sheet is not in its desired location, some areas of the face sheet might be undercut (not cleaned up) and other areas might be overcut (too much material removed).

Examples of the foam-like material 122 include, but are not limited to, polyurethane, polyisocyanurate, carbon foam, ceramic, and autoclave aerated concrete. The foam-like material 122 may be in the form of blocks, or it may be poured and cured, or it may be added by some combination thereof. The foam-like material 122 may be sealed with compatible materials (e.g., parent resin or an alternative resin) to prevent excess adhesive from enter the foam-like material.

Figure 2C:
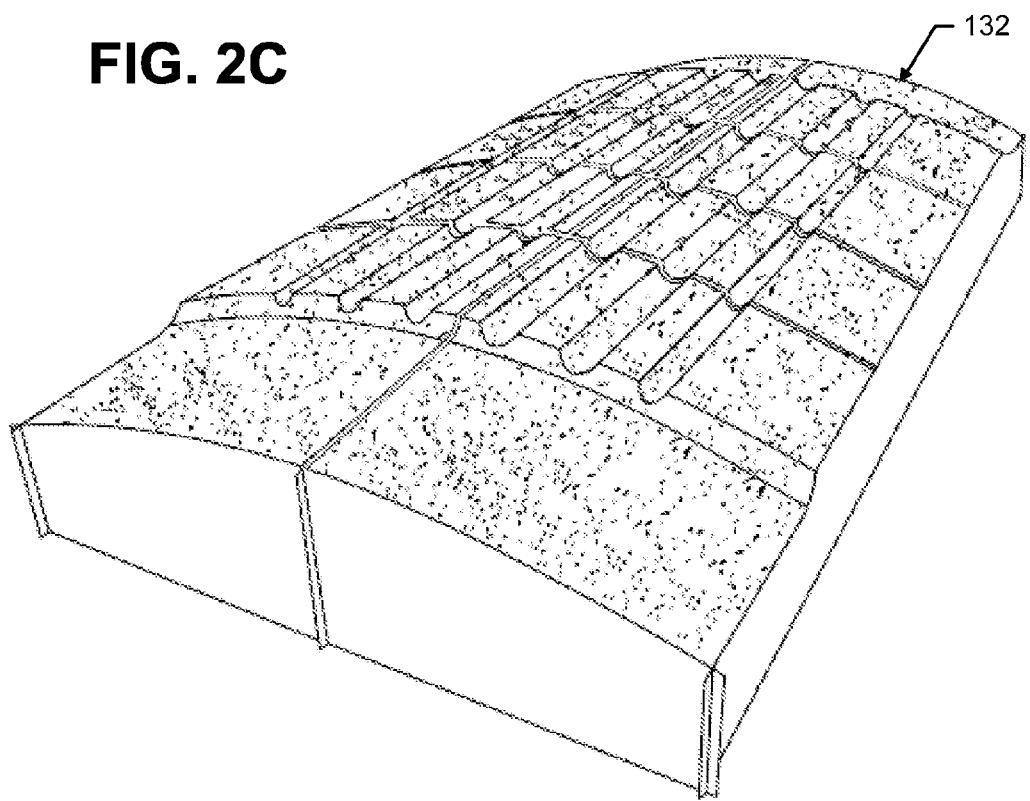

At block 130, the foam-like material 122 and the header boards 114 are machined to obtain a desired surface for layup of a face sheet. An example of the resulting machined surface 132 is illustrated in FIG. 2C.

At block 140, the face sheet is formed on the machined surface 132. Prior to forming the face sheet, however, an adhesive layer may be applied to the machined surface 132 to assist with bonding the face sheet to the header boards 114 and to keep resin from penetrating the foam-like material 122. The adhesive is preferably compatible with the parent resin and may be supported or unsupported.

The face sheet may be formed by placing fabric including reinforcing fibers on the adhesive layer. The fibers may be dry or they may be prepregs. If the fibers are dry, the dry fibers are subsequently infused with resin. This resin has been referred to as the "parent" resin. The resin-infused fibers or the prepregs are then bagged and cured. The face sheet may be tied to the header boards by the combination of bonding and mechanical fastening. The mechanical fastening may be performed with clips or brackets.

At block 150, the foam-like material 122 may be removed from the cellular structure 112. For resin-infused fibers, the foam-like material 122 may be removed after resin infusion but prior to cure. For prepregs, the foam-like material 122 may be removed after cure. In some embodiments, the foam-like material 122 may be gouged and dug out from the back side of the cellular structure 112. In other embodiments, the foam-like material 122 may be removed in-tact as blocks.

In some embodiments, the foam-like material 122 may be removed completely from the cellular structure 112. The foam-like material 122 may be removed to ensure that thermal requirements are met during curing (for instance, to ensure that heat is transferred through the back side of the tool). The foam-like material 122 is an insulator that can insulate the backside of the tool from a heat source, thereby interfering with the necessary temperatures in the required times as determined by the cure profile requirements. For tools having short header boards, the foam-like material may have a lower thermal impact and, consequently, may be left in place.

If blocks of the foam-like material 122 are removed intact, the blocks may be re-used. Reusing the blocks can reduce future costs and increase speed of manufacture. To enable in-tact removal, steps are taken prior to filling the cellular structure 112. For instance, the walls of the header boards 114 may be lined with slip sheets (sheets made of materials such as Teflon nylon, flouroelasomer), or they may be lined with release films, or other material that reduces the bond or coefficient of friction between the foam-like material 122 and the header boards 114. In addition, draft angles in the cellular structure 112 may facilitate removal as an angle may improve the ease by which the foam-like material 122 is pulled out.

At block 160, the exposed surface of the face sheet is machined and benched to a final profile. The final machining assures tolerances that are ordinarily difficult to attain with typical master tool castings. Final face sheet thickness is a function of durability of the tool and stress loads imparted to the tool. If minimum final thickness of 0.25" will ensure durability, then an initial thickness (e.g., 1 inch) is sized accordingly to allow machining to this final thickness. The machining may be performed on a milling machine. The sanding may impart a desired aero-quality surface finish to the mold line surface.

The machined face sheet surface may form an inner or outer mold line surface of the part, depending on the intended application of the composite part. Tool sides of the composite part typically have a better surface finish than bag sides of the part unless a caul sheet is used to create a better surface finish on the bag side of the part.

At block 170, the machined face sheet surface may then be cleaned, sealed and release-coated. The sealing fills any small voids, and the release coating provides a non-stick treatment so the cured part can be removed from the tool without binding.

Figure 2D:
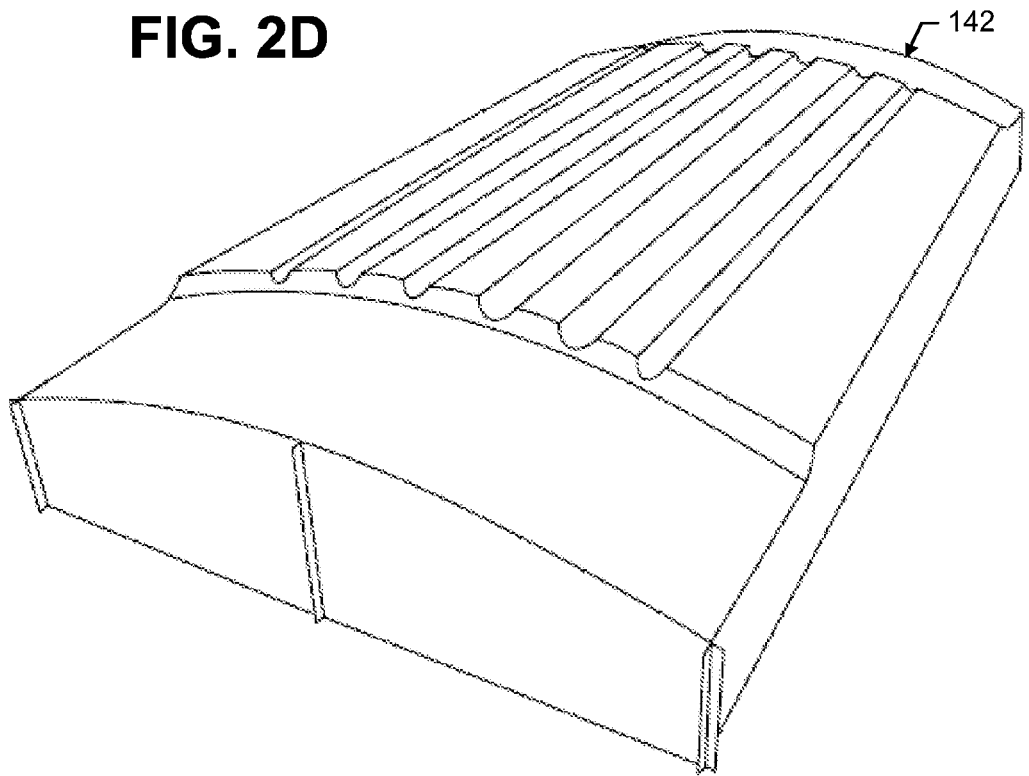

Additional reference is made to FIG. 2D, which illustrates an example of a layup mandrel tool including a machined face sheet 142. The face sheet 142 is co-bonded to the header boards 114. The header boards 114 provide integral stiffening to the face sheet 142, enable attachment to substructure for high profile tools, and provide a basic leveling system for low-profile tools (use as-is). The integral stiffening is valuable for larger face sheets 142, which become more "flimsy" as the face sheet area becomes larger. The integral stiffening also increases rigidity of the face sheet 142.

At block 180, the layup mandrel tool is ready for use. In some embodiments, the tool alone may be used to fabricate composite parts.

In other embodiments, the mandrel tool may be a section of a larger mandrel tool system. The mandrel tool system may be formed by assembling together a plurality of sections. A vacuum seal plane may be used between sections to ensure vacuum integrity across the entire mandrel tool system. If a section needs to be shipped from fabrication site to a layup site, it may be advantageous to assemble the sections at the layup site to avoid the cost and delays of oversize load shipping.

A high profile tool (generally greater than approximately 24 inches in height) may use a substructure to reduce the height of the header boards, and volume of foam-like material. The substructure may support the tool above a floor or a cart without sacrificing tool stiffness (the header boards provide stiffness to the face sheet surface). In contrast, a low profile tool may be used "as is" with relatively short header boards for part production without the need for any additional substructure to support the tool from the floor or a cart.

Durability of the masterless tool may be increased by increasing the thickness of the face sheet, and increasing stiffness and thickness of the header boards. Header board stiffness may be increased by reducing the spacing between header boards. Durability may also be increased by selecting a more durable material for the header boards. For instance, BMI is more durable than epoxy.

Composite parts may vary in size. Composite parts may have a surface area of at least approximately 1 foot by 1 foot.

Figure 3:
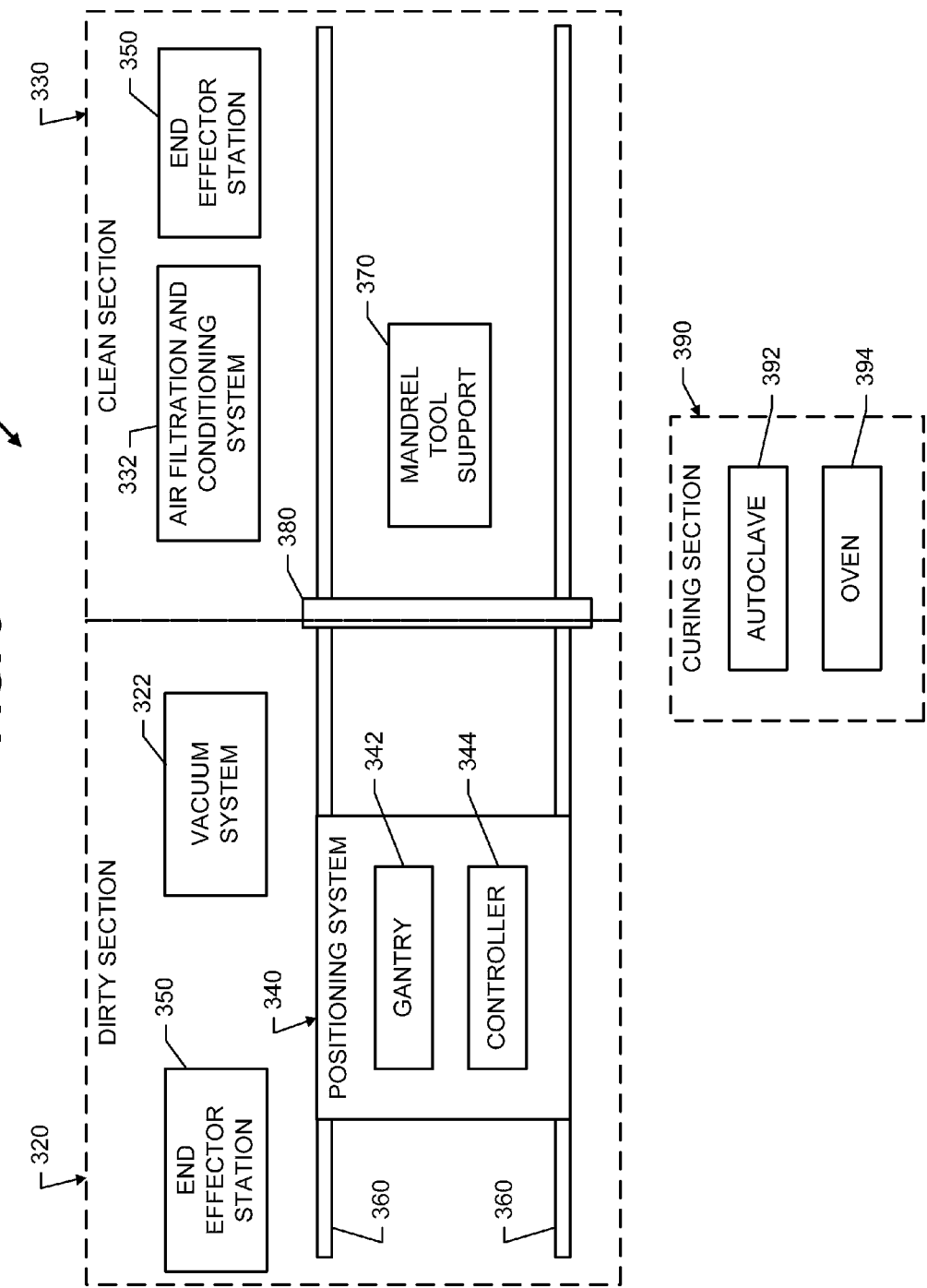
FIG. 3 is an illustration of a fabrication cell having adjacent clean and dirty sections.

Reference is made to FIG. 3, which illustrates a single fabrication cell 310 for manufacturing the mandrel tool and also using the mandrel tool to fabricate the composite part. By building the mandrel tool and using it at the same site, the cost, time, and logistics of shipping, (all of which are substantial for large commercial aircraft) are reduced. Only the fabricated composite part is shipped.

The fabrication cell 310 includes a dirty section 320 and a clean section 330. Operations in the dirty section 320 may include, but are not limited to, assembly and machining (e.g., trimming, milling and drilling) of the mandrel tool and the cured composite part. Operations are considered dirty if they can produce dust that violates clean room requirements for the processing of uncured composite materials. For "dirty" operations such as machining, the dirty section 320 may include a vacuum system 322 for minimizing dust and debris. The vacuum system 322 may have up to 98% or greater effectiveness from removing dust.

Operations in the clean section 330 may include composite layup on a mandrel tool. In some embodiments, fibers may be deposited on a layup mandrel tool that is static. In other embodiments, fibers may be deposited on a layup mandrel tool while the tool is being rotated. The composite layup may include face sheet layup and part layup.

Operations in the clean section 130 may further include caul plate installation, bagging, and material cutting. For instance, fabric for resin infusion or pre-impregnation could be cut by an ultrasonic knife or other device, such as a ply cutter, or a hand tool. Resin infusion may also be performed in the clean section 330.

Operations are considered clean if they do not violate clean room requirements and require being performed in a clean room due to contamination concerns (e.g., processes that involve handling uncured composite materials). The clean section 330 may include an air filtration and conditioning system 332 for maintaining environmental conditions within specification. Generally, composite facilities require 400,000 class clean rooms with temperature, humidity, and particle count monitored. The equipment and tooling should satisfy these requirements when moved from the dirty section 320 to the clean section 330. Should the clean section 330 fall out specification, wait time may be required for air circulation filters of the system 332 to remove dust from the air.

The fabrication cell 310 includes a common end effector positioning system 340, movable between the dirty and clean sections 320 and 330, for performing all of these clean and dirty operations. The end effector positioning system 340 may use a plurality of interchangeable end effectors for performing the operations. The end effectors may be located at end effector stations 350 located in the dirty and clean sections 320 and 330. A manual, automatic, or semi automatic changer may be used to change end effectors in both dirty and clean sections 320 and 330.

The end effectors may include tools for machining (e.g., milling, drilling), a water jet cutter for tool header board, tools for trimming, a lamination head for tape or slit tape tow laydown of the part or face sheet, a paint spray head for painting, an ultrasonic cutter for cutting prepreg or dry material, an NDI head (with necessary shoes) for ultrasonic inspection of the part or tool face sheet, a stringer roll former for forming composite part elements, a material dispenser for tool or part materials, a foam material dispenser for tooling foam application such as a 2-part polyisocyanurate system, a handling end effector for placing pre-cured foam tooling blocks in the tool header boards, and inspection probes for geometric and dimensional inspection of the tool face sheet or composite part.

In some embodiments, the end effector positioning system 340 may include a single positioning machine such as a gantry 342 having multiple axes of motion (e.g., up to seven axes). In other embodiments, the positioning system 340 may include a robot or multiple robots for performing the clean and dirty operations. A single robot may have interchangeable end effectors. Multiple robots may use combinations of dedicated end effectors.

Other types of end effector positioning systems may include combinations of linear Cartesian axis platforms, rotary axis platforms, and Stewart platforms using parallel kinematics. Specific examples include gantries, robots, robots-on-rail, post-mill type platforms, and Stewart platforms (e.g. hexapods). In each of these examples, the end effector positioning system 340 is configured to deliver a selected end effector to a position or along a path to perform its function, while satisfying performance requirements (e.g., angles, velocity, acceleration, stiffness, range of travel, utilities, quick-release coupling).

The end effector positioning system 340 is movable between the dirty and clean sections 320 and 330. In some embodiments, the end effector positioning system 340 may be moved by a machine rail system 360. In other embodiments, the end effector positioning system 340 may be moved via air bearings or wheels, and then locally positioned.

A mandrel tool support 370 is provided to support the mandrel tool during layup. In some embodiments, the mandrel tool support may include a table 370 that is moveable between dirty and clean sections 320 and 330. The table 370 may be positionable between machine legs of a gantry 342.

The end effector positioning system 340 may be covered with sheet metal or other material that provides a smooth surface for cleaning. The end effector positioning system 340 may also utilize polyethylene type plastic as a protective covering. Such plastic may be easily removed for cleaning before transferring the end effector positioning system 340 from the dirty section 320 to the clean section 330. This all helps to maintain clean room requirements.

In some embodiments, a barrier 380 such as a fast door, strip door or freezer door separates the dirty and clean sections 320 and 330. These doors are designed to maintain environmental controls between areas with different conditions. The clean section 330 may be positive pressurized to keep out dust and other contaminants.

In some embodiments, the barrier 380 may include an airlock, which may be fixed or portable. The airlock may include of a chamber with two airtight doors in series. The doors do not open simultaneously. In general, an airlock permits the passage of people and objects between a pressure vessel and its surroundings while minimizing the change of pressure in the vessel and loss of air from it. An airlock having an accordion design may include a portable sealed chamber that covers the end effector positioning system 340 as it transitions between the sections 320 and 330 to keep any contaminants out of the clean section 330.

For movement from the clean section 330 to the dirty section 320, the clean section door is opened, the end-effector positioning system 340 (which is already clean) is moved into the airlock, the clean section door is shut, the dirty section door is opened, and the end effector positioning system 340 is moved into the dirty section 320. The dirty section door is then shut.

For movement from the dirty section 320 to the clean section 330, the dirty section door is opened, the end-effector positioning system 340 (which is already dirty) is moved into the airlock, and the dirty section door is closed (the clean section door is already closed). The end effector positioning system 340 is cleaned (e.g., protective coverings are stripped off, and the system 340 is wiped down). After the environment inside the airlock is validated as clean, the clean section door is opened, and the end effector positioning system 340 is moved into the clean section 330.

The fabrication cell 310 may also include a nearby curing section 390 for curing of the face sheet and composite part. In some embodiments, the curing section 390 may include an autoclave 392 for curing prepregs under heat and pressure. In other embodiments, the curing section 390 may include an oven 394 for curing resin-infused fabric under heat or prepreg material designed for out-of-autoclave processing.

The curing section 390 is preferably adjacent to the clean section 330. Close proximity simplifies handling logistics. The tool and or part may be shuttled to the autoclave on heat suitable castors or wheels on the underside of the mandrel tool or on a dolly designed to withstand autoclave cure.

Nondestructive inspection of the cured part may be performed in the clean section 330. The nondestructive inspection may instead be performed in the dirty section 320, provided that dust does not interfere with the non destructive inspection.

The fabrication cell 310 may have a relatively small footprint. Consider an example of a fabrication cell for fabricating composite parts as large as 45 feet long, 20 feet wide, and 12 feet tall. Such a cell may have a floor area of about 5,000 square feet and a ceiling height of about 25 feet. The floor of the fabrication cell 310 may be flat, with a foundation sufficient for the weight and loading of the end effector positioning system 340. The relatively small footprint enables multiple fabrication cells to be constructed at different locations instead of a single large cell being constructed at a large central facility.

An advantage of the fabrication cell 310 is that it may be located remotely from the aircraft manufacturer's main production facility. For instance, a fabrication cell may located closer to an airport or other location where aircraft will be repaired. The closer location saves significant logistics costs (e.g., packaging, transporting) and reduces flow time. This further reduces aircraft down time.

The fabrication cell 310 may also include a common controller 344 for moving the end effector positioning system 340 along the rail system 360 and commanding the end effector positioning system 340 to perform the clean and dirty operations. The controller 344 may be fed programs from a programming and simulation tool. This programming and simulation tool may be designed to provide the necessary instructions for all end-effector types used within the fabrication cell 310.

Figure 4:
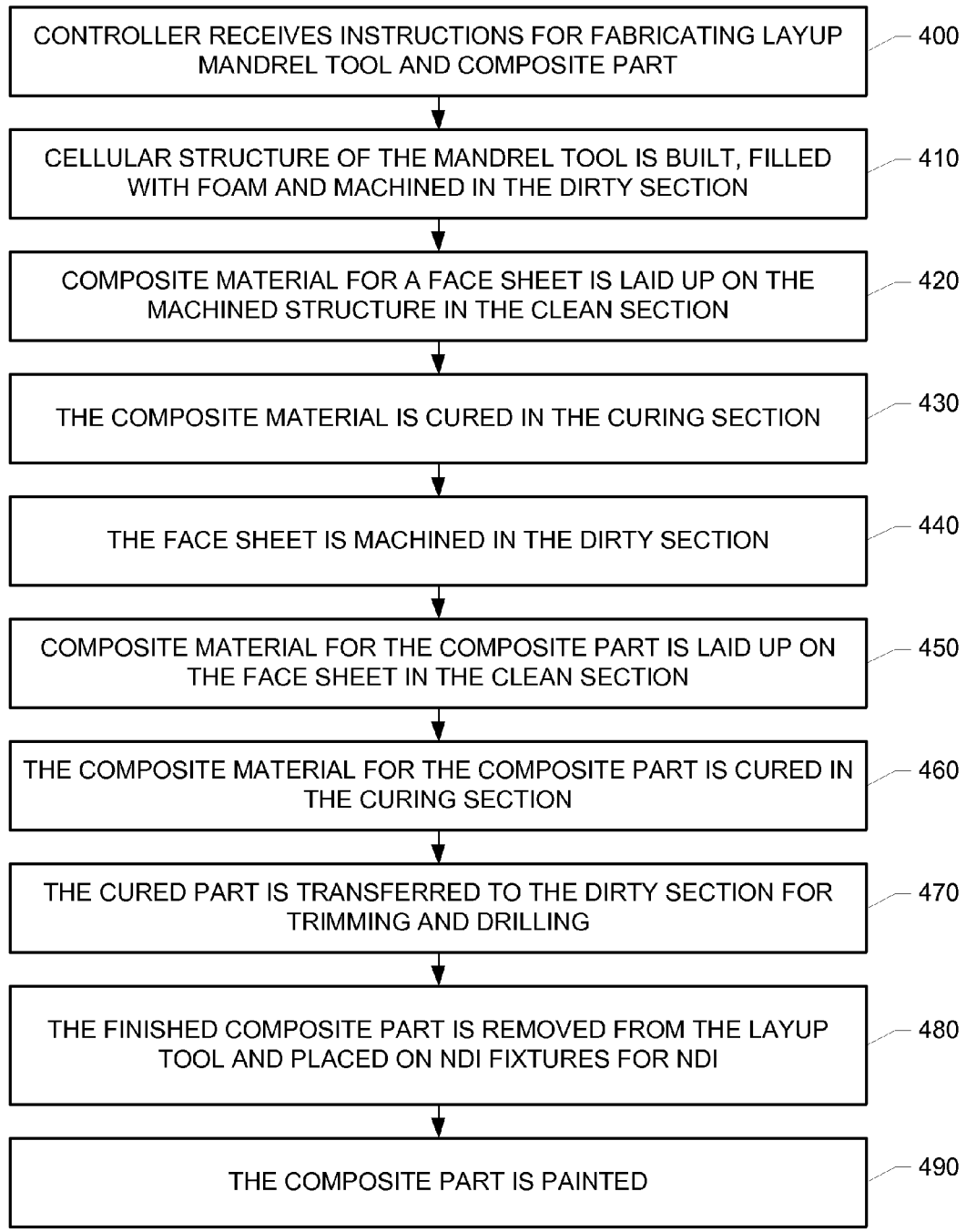
FIG. 4 is an illustration of a method of using the fabrication cell to fabricate both the layup mandrel tool and the composite part.

Reference is now made to FIG. 4, which illustrates a method of using the fabrication cell 310 to fabricate both the layup mandrel tool and the composite part. At block 400, the controller 344 receives instructions for fabricating the tool and part. The instructions provide the commands for the end effector positioning system 340 to select end effectors and use the selected end effectors to perform their desired functions. For a hole drilling end-effector, the instructions may include position and angle of the drill, feed rate, rotation speed, and drill cycle instructions. For milling of a tool or edge trimming of a part, the milling end-effector instructions may include the path for the cutter, angular position, rotation speed, and feed rate. For a fiber placement end effector, the instructions may include the path for the head, angular position, and cut and add commands for the different tows. The instructions may be produced by a programming and simulation module, which is designed for the fabrication cell 310. The programming and simulation module derives the instructions from engineering definitions associated with the composite part and tool. The engineering definitions may identify surface geometry and features such as holes, trim locations, and ply boundaries. The programming and simulation module takes these requirements from the engineering definition and converts them into instructions that can be processed by the fabrication cell 310. The controller 344 then executes the instructions to perform the following.

At block 410, a cellular structure of the layup mandrel tool is built, filled with foam and machined in the dirty section. The layup mandrel tool may be built with composite header boards, which may be cut with a water jet cutting tool or a router tool. In some embodiments, the header boards may be assembled on and secured to a moveable table, whereby the moveable table "becomes" part of the mandrel tool.

The resulting cellular structure is assembled and filled with foam-like material, using dispensed and mixed liquid, blocks of pre-cast material, or a combination thereof. Following build up, the end effector positioning system 340 selects a milling end effector from the end effector station 350, loads the milling end effector, and machines the foam-like material and header boards. The end effector positioning system 340 then selects and loads a probe head, and uses the probe head for location verification or inspection to validate geometry.

At block 420, reinforcing fibers for a face sheet is laid up on the machined cellular structure in the clean section. In some embodiments, fabric may be dispensed by a fabric dispensing end effector, and the dispensed fabric may be cut by an ultrasonic cutting knife end effector. The fabric may be deposited by an end effector that performs automated fiber placement (AFP) or automated tape layer (ATL). In other embodiments, the layup may be performed manually by draping and hand layup, etc. Dispensed fabric may be cut by an ultrasonic cutting knife end effector.

At block 430, the composite material is cured in the curing section 390. A resin-infused layup is cured in the oven, or a prepreg layup is cured in the autoclave, or an out-of-autoclave system is cured in an oven. Resin infusion may include a post-cure at approximately 350° F. for epoxy materials, and higher for BMI materials. Prior to post-curing, the foam-like material may be removed from the mandrel tool, especially for tools having taller header boards.

At block 440, the face sheet is machined in the dirty section and benched to a final profile. Any necessary hand finish is also performed in the dirty section. Appropriate vacuum is utilized for dust collection. Sealing of the tool may also be performed using an automated end effector (spray of roller) or manual process. A finished layup mandrel tool is then cleaned and transferred to the clean section for part layup.

At block 450, composite material for the composite part is laid up on the mandrel tool in the clean section. The part layup may be performed automatically by the end effector positioning system 340 (for example, with an end effector that performs AFP or ATL) or the part layup may be performed manually.

Caul plates may then be placed on the part layup (depending on finish requirements). The part layup is then bagged, and moved to the curing section.

At block 460, the composite material for the part is cured in the curing section 390. At block 470, the cured part is transferred to the dirty section 320, where trimming and drilling are performed.

At block 480, following trimming and drilling, the finished composite part is removed from the layup tool. A relatively large part may be removed with a lifting fixture. The finished part is placed on an NDI fixture to enable ultrasonic inspection. The end effector positioning system 340 may perform NDI by selecting NDI end effectors (shoes) that are applicable for the part geometry.

At block 490, following NDI, the composite part is moved to the dirty section, where it is painted (in other embodiments, the painting may be performed in a separate facility). The end effector positioning system 340 may use a painting end effector. Some additional ventilation (portable ducts, etc.) may be provided to facilitate painting in the dirty section 320.

The layup mandrel tool and the end effector positioning system 340 are cleaned prior to moving from the dirty section 320 to the clean section 330. If a foam or carbon fiber is cut, a high performance vacuum collection system 322 may be deployed to minimize dust, possibly with some coolant to keep airborne particles to a minimum.

Conventional composite and metallic (e.g., titanium) fabrication techniques may be used to fabricate splice doublers and other elements for fastening the composite part. In some embodiments, titanium fastening alone, or composite elements alone, or a combination of titanium and composite fastening elements may be used. The elements made of titanium may be fabricating by conventional titanium fabrication processes such as hot forming and machining. The composite fastening elements may be fabricated by conventional composite prepreg fabrication techniques such as hand layup, bag, cure, trim and non-destructive ultrasonic inspection. Automated Fiber Placement may be used instead of hand layup for unidirectional material. In some embodiments, composite doublers, fillers, and splices could be built using the same production site following the same or similar processes as the composite part.

In some embodiments, a separate clean section is not used. Instead, all operations are performed in a single room. For instance, the single room may include a dust collection system that is satisfactory to maintain clean room specifications. Other embodiments may use temporary/disposable coverings that are placed on machines and tool areas to keep them clean. For example, the covers may include polyethylene film. Some wiping down of the machines and tools may be performed between operations. The same machine could perform layups in the clean room and use an ultrasonic cutting head for cutting materials.

In some embodiments, the layup mandrel tool may be built at one site and used at another site. However, extra steps may include shipping the mandrel tool to the build site, and unpackaging the tool and setting up the tool at the build site. Fabricating the mandrel tool and using it at the same site saves significant logistics costs and reduces flow time.

During layup of the part and the face sheet, fabric is deposited on a surface of the mandrel tool (either the machined surface of the header boards/foam or the mold line surface of the face sheet). In some embodiments, the mandrel tool support may be static during layup.

In other embodiments, the mandrel tool may be rotated during layup. In these other embodiments, the mandrel tool support may include a rotary mandrel tool support. The support is used to rotate a mandrel tool while reinforcing fibers are deposited on a layup surface of the mandrel tool.

As for the design of a composite part, the engineering definition specifies the width of the tape that will be used during composite layup. That engineering definition may specify the width of the tape used during layup of the original part. However, fabrication speed may be increased during layup by using a wider tape. By using wider tape, layup flow times may be reduced, since laydown is faster for the same number of tows in a course. The wider tape may also enable manual layup as a fabrication option. The wider tape may provide a faster manufacturing solution for constant contour smaller or flat parts, or far larger parts if, for instance, an AFP machine is down for repairs.

Figure 5:
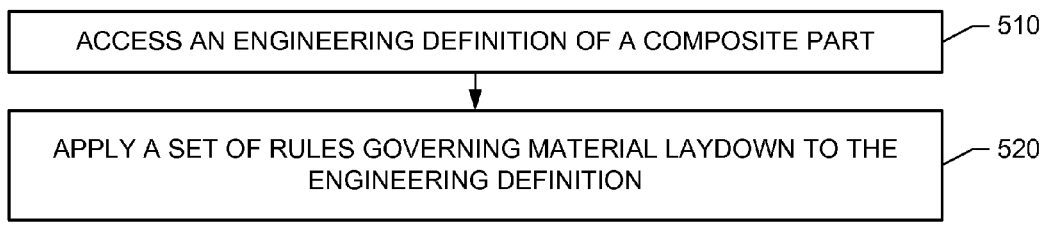
FIG. 5 is an illustration a method of determining whether tape width may be increased for a layup of a composite part.

Reference is now made to FIG. 5, which illustrates a method of determining whether wider tape may be used. At block 510, an engineering definition of a composite part is accessed. In addition to specifying material and surface geometry, the engineering definition may also define process specifications for the composite part. These process specifications may include layup instructions, processing instructions, cure instructions, processor qualifications, and inspection instructions. Process specifications may also describe allowable deviations during laydown (e.g., laps, gaps, and angular deviation from the rosette) and allowable defects in the layup (e.g., wrinkles and puckers).

At block 520, a set of rules governing material laydown is applied to the engineering definition prior to performing the laydown. The rules identify deviations and defects that will result if material of a given width is laid down in a specified direction and position. Laminates from different width materials have different mechanical performance. Different types of laminates may also have different mechanical performance.

These rules include algorithms that determine tape path for each layer of tape (a tape path includes a series of coordinate positions that determine the movement of a tool (e.g., a fiber placement head) during a machining operation). The algorithms include path generation algorithms that determine minimum steering radius for each different tape width. The algorithms further include, but are not limited to rosette algorithms that specify a rosette (direction); and natural path (which may be characterized as the path that produces a state of neutral fiber tension, where the same distance is continuously maintained between both sides of the tape).

The rules indicate whether, based on the rosette and contour of the part, material of a given width may be laid down in the desired direction and position without defects such as wrinkles or puckers. Consider the following example. Wider tape or slit tape will generally have a smaller minimum steering radius than narrower tape (where minimum steering radius is the smallest radius by which material can be steered material with an acceptable level of wrinkles or puckers). A rule may determine whether a wider tape violates the minimum steering radius.

The rules are derived from process specifications and empirical material performance. For example, minimum steering radius may be obtained for different types (material system, weave, resin content, etc.) and width of composite material by testing on a flat plate and looking for wrinkles or puckers that are within allowable limits. The type of machine used and process parameters (e.g. tension, compaction force) for the machine may also influence the results. Laminate mechanical property performance is another example of data that can be provided from testing, such as tension and compression testing. Initially, the empirical data may be obtained from testing material coupons. Over time, additional data may be obtained from testing subcomponents, or complete assemblies.

The result of applying the rules is a list of tapes (by type and width) that may be used to fabricate the composite part. In some instances, the list may indicate allowable tapes per ply or part portion. As a first example, consider a contoured or compound contoured fuselage section. For this part, the list allows up to a 6" wide tape for a 90 degree fiber orientation, but no more than a one-half inch tape for other fiber orientations (e.g., 0 and 45 degrees).

As a second example, the list allows a ½" wide material for all areas and all fiber orientations of a part, except for one small zone. The list allows narrower width material (¼") for that small zone.

The method of FIG. 5 enables the producibility (or manufacturability) of the composite part to be tested before the part is actually fabricated. By considering an increase in tape width during the design of the composite part, empirical testing is minimized, thereby speeding up part production. Trial and error are avoided. Multiple iterations of redesigning, refabricating and revalidating the part are avoided. Considerable time and cost is saved from the need to physically build validation coupons and follow an iterative process of testing. This reduction in time is especially valuable for designing and fabricating composite parts that are customized.

In some instances, a plurality of fabrication cells will be available to fabricate a composite part. These facilities have different capabilities including, but not limited to, the types of layup (hand versus automated) that may be performed, the type of machines that are available, the type of end effectors that are available, and the widest available tapes that can be deposited.

Figure 6:
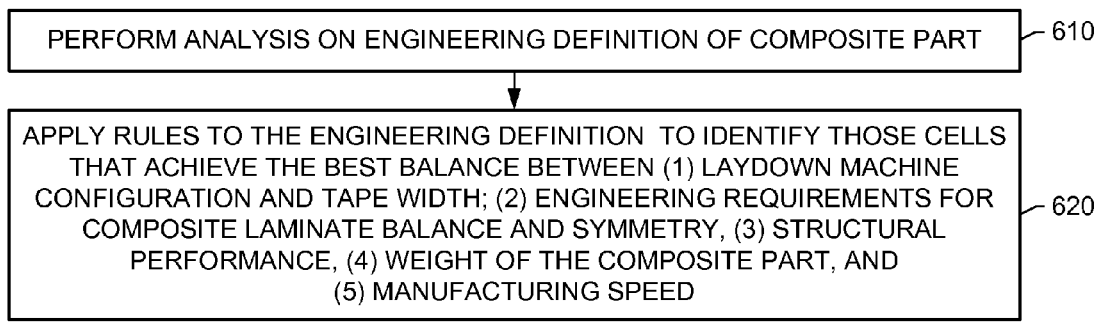
FIG. 6 is an illustration of a method for selecting a cell to fabricate a composite part.

Reference is now made to FIG. 6, which illustrates a method of performing a rule-based producibility analysis, not only to increase tape width, but also to find a fabrication cell for fabricating a composite part. At block 610, analysis is performed on the engineering definition of a composite part to understand the magnitude of the contour of the part. By understanding the magnitude and contour, choices for tape width can be narrowed. For typical automated fiber placement material, typical material widths of ⅛", ¼", and ½" may be used. For hand layup and automated tape layup, wider tapes of 3", 6", and 12" may be used. For hand layup, broad materials in typical widths of 36", 48", and up to 60" may be used.

Some of these candidate tape widths may be eliminated at this step. For example, compound contour parts are highly unlikely candidates for hand layup (likelihoods would be based on prior producibility knowledge). Automated layup with narrower tapes (⅛", ¼", ½") would only be considered. On the other hand, parts having relatively uniform surfaces might be candidates for hand layup with 6" tape. The initial analysis reduces the overall analysis time by narrowing the type of layup (e.g., hand layup versus automated layup), candidate tape widths (e.g., ½" tape versus ¼" tape), candidate automated machines (e.g., machines not having capability to lay down ¼" tape would be eliminated from further consideration), and candidate cells (e.g., cells not having capability to lay down ¼" tape would be eliminated from further consideration).

At block 620, a set of rules is applied to the engineering definition to identify the widest tape and best cell for fabricating the composite part. The rules identify those cells that achieve the best balance between (1) laydown machine configuration and tape width; (2) engineering requirements for composite laminate balance and symmetry, (3) structural performance, (4) weight of the composite part, and (5) speed of manufacturing the composite part (e.g. within material out time limits, machine capability, machine availability window, labor time/cost, customer need date, etc.). Other factors to be balanced may include, but are not limited to manual laydown instead of automated laydown, and engineering change effort. Engineering change effort refers to modifications from existing production configuration to incorporate different tape widths. This balance involves a trade in design change time for production time.

For instance, the rules may determine whether a laydown machine configuration can perform a layup at a specified tape width, as there are limits to course sizes due to compliance of the part surface. Consider the example of machines that have thirty two ½" wide tows or slit tape of material and others that have sixteen ½" tows. The compaction roller for a ½" thirty two—tow machine is 16 inches, whereas it is 8 inches for a ½" sixteen tow machine. For the same width tow, the greater the quantity of tows that can be simultaneously employed, the faster the laydown time, assuming constant speed. In some cases, depending on part contour the number of tows out of the total available may be limited. For example, a machine with thirty two tows over a part with a complex contour, may have a limit of eighteen or nineteen tows that can be effectively used because of roller compliance, and in some cases potentially less, so a ½" (32) tow machine may provide unneeded capacity for a given part configuration. Wider tapes will likely have more challenges in compliance, especially over complex contours. Assuming a common laydown speed, the more tows, the faster material can be laid down and the faster the part can be fabricated.

Figure 7:
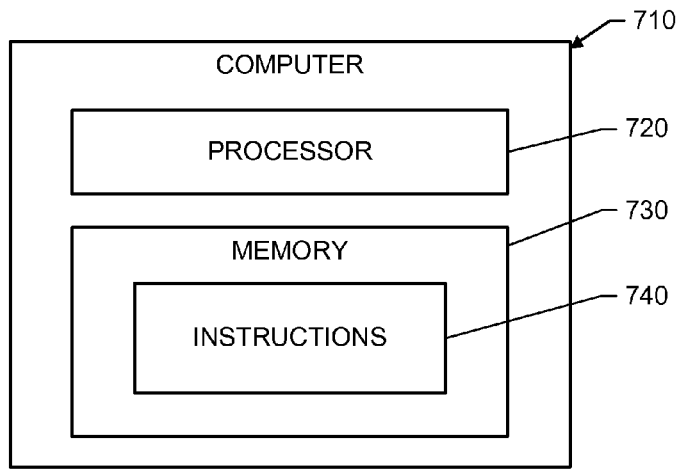
FIG. 7 is an illustration of a computing machine for performing the method of FIG. 6.

Reference is now made to FIG. 7, which illustrates a computer 710 including a processor 720, and memory 730. The memory 730 contains instructions 740 for causing the computer 710 to perform the method of FIG. 6.

Rapid fabrication herein is not limited to any particular type of composite part. Examples of composite parts include, without limitation, wing panels, cargo door panels, automobile hoods and panels, truck hoods and panels, panels for composite tanks, and composite domes. Some of these parts may have complex contoured surfaces.

The invention claimed is:

1. A method comprising:
fabricating a composite part and a masterless layup mandrel tool for the part at a fabrication site, the tool including a composite face sheet that provides a layup surface;
the fabrication site including a dirty section for performing dirty operations on the mandrel tool during fabrication and on the part after the part has been cured, the dirty operations including machining the mandrel tool and the cured part;
the fabrication site further including a clean section for laying down the face sheet and laying down reinforcing fibers of the part on the layup surface of the mandrel tool;
wherein the dirty section and the clean section are located in separate areas of the fabrication site.

2. The method of claim 1, wherein the face sheet has surface area of at least 1×1 feet.

3. The method of claim 1, wherein the layup surface of the face sheet provides a complex contoured mold line surface.

4. The method of claim 1, wherein temperature, humidity, and particle count in the clean section are maintained to satisfy composite material process requirements.

5. The method of claim 1, wherein the part is cured in an adjacent curing section.

6. A method comprising fabricating a masterless layup mandrel tool and a composite part at a fabrication site, the fabrication site including a dirty section for performing dirty operations on the tool during fabrication and on the part after the part has been cured, the fabrication site also including a clean section for laying up reinforcing fibers of the part on a layup surface of the mandrel tool;
wherein an end effector positioning system having interchangeable end effectors is used to perform the clean and dirty operations; and wherein the end effector positioning system and the mandrel tool are moved between the clean and dirty sections.

7. The method of claim 1, wherein operations in the dirty section further include trimming the mandrel tool and trimming the cured part; and wherein operations in the clean section further include cutting of the reinforcing fibers.

8. The method of claim 1, further comprising, prior to forming the layup of the composite part, applying a set of rules governing material laydown to an engineering definition of the composite part to determine allowable tape widths for the reinforcing fibers; and selecting an allowable tape width that increases speed of forming the layup of the composite part.

9. The method of claim 8, wherein the rules are derived from empirical data as a function of tape width.

10. The method of claim 8, wherein the rules determine different tape widths for different plies of the reinforcing fibers.

11. The method of claim 8, wherein the rules determine different tape widths for different portions of the layup of the composite part.

12. The method of claim 1, wherein an end effector positioning system having interchangeable end effectors is used to perform at least some of the clean and dirty operations; and wherein the end effector positioning system and the mandrel tool are moved between the clean and dirty sections.

13. The method of claim 1, wherein the mandrel is moved between the clean and dirty sections during fabrication of the mandrel and the composite part.

* * * * *